(12) United States Patent
Maxe et al.

(10) Patent No.: US 11,001,932 B2
(45) Date of Patent: May 11, 2021

(54) METHOD FOR MANUFACTURING A PLATE MATERIAL FOR ELECTROCHEMICAL PROCESS

(71) Applicant: Outokumpu Oyj, Helsinki (FI)

(72) Inventors: Jan-Olof Maxe, Torshalla (SE); Peter Bamforth, Strangnas (SE); Timo Piitulainen, Avesta (SE); Sara Randström, Avesta (SE); Henrik Ahrman, Hedemora (SE); Lennart Johansson, Krylbo (SE)

(73) Assignee: Outokumpu Oyj, Helsinki (FI)

( * ) Notice: Subject to any disclaimer, the term of this patent is extended or adjusted under 35 U.S.C. 154(b) by 374 days.

(21) Appl. No.: 15/546,343

(22) PCT Filed: Jan. 26, 2016

(86) PCT No.: PCT/FI2016/050039
§ 371 (c)(1),
(2) Date: Jul. 26, 2017

(87) PCT Pub. No.: WO2016/120525
PCT Pub. Date: Aug. 4, 2016

(65) Prior Publication Data
US 2018/0038005 A1    Feb. 8, 2018

(30) Foreign Application Priority Data
Jan. 27, 2015 (FI) ..................................... 20155057

(51) Int. Cl.
*C25C 7/02* (2006.01)
*C25C 1/08* (2006.01)
(Continued)

(52) U.S. Cl.
CPC ............... *C25C 7/02* (2013.01); *B21B 1/22* (2013.01); *B24C 1/06* (2013.01); *B24C 1/10* (2013.01);
(Continued)

(58) Field of Classification Search
CPC ....... B21B 1/227; B21B 27/005; B21D 31/06; C22F 1/08; C22F 1/10; C22F 1/14;
(Continued)

(56) References Cited

U.S. PATENT DOCUMENTS 4,414,071 A    11/1983  Cameron et al.
5,049,221 A *   9/1991  Wada ..................... B32B 38/10
                                                         156/151
(Continued)

FOREIGN PATENT DOCUMENTS

CA    2838877 A1 * 12/2012 ............... C25C 7/02
CA    2870097 A1 * 10/2013 ............. C25B 11/04
(Continued)

OTHER PUBLICATIONS

Nehl et al., Selective Electrowinning of Silver and Gold From Cyanide Process Solutions, 1993 (Year: 1993).*
(Continued)

*Primary Examiner* — Teresa M Ekiert
*Assistant Examiner* — Sarkis A Aktavoukian
(74) *Attorney, Agent, or Firm* — The Webb Law Firm

(57) ABSTRACT

The invention relates to a method for manufacturing a plate material which is used in the electrochemical process of metal as a part of a cathode on which surface a metal is deposited. The surface roughness of the plate material for the adhesion between the metal deposit and the plate material is achieved with at least one treatment in a coil processing line.

25 Claims, 1 Drawing Sheet

Figure 1:
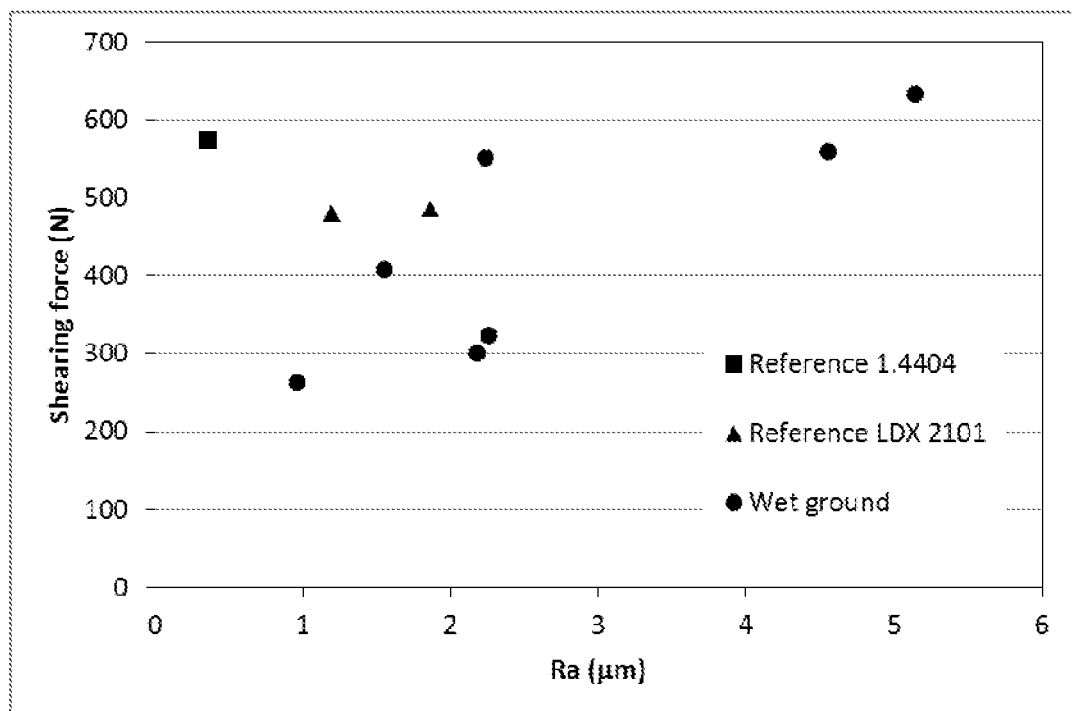

(51) Int. Cl.
| | |
|---|---|
| *C25C 1/12* | (2006.01) |
| *C25C 1/20* | (2006.01) |
| *C25C 7/08* | (2006.01) |
| *B24C 1/06* | (2006.01) |
| *B21B 1/22* | (2006.01) |
| *B24C 1/10* | (2006.01) |
| *C22C 38/00* | (2006.01) |
| *C22C 38/04* | (2006.01) |
| *C22C 38/42* | (2006.01) |
| *C22C 38/44* | (2006.01) |
| *C23F 1/00* | (2006.01) |

(52) U.S. Cl.
CPC ............ *C22C 38/001* (2013.01); *C22C 38/04* (2013.01); *C22C 38/42* (2013.01); *C22C 38/44* (2013.01); *C25C 1/08* (2013.01); *C25C 1/12* (2013.01); *C25C 1/20* (2013.01); *C25C 7/08* (2013.01); *B21B 2001/221* (2013.01); *C23F 1/00* (2013.01)

(58) Field of Classification Search
CPC ... C21D 7/00; C21D 7/02; C21D 7/04; C21D 7/06; C21D 7/08; C21D 8/0236; C21D 8/0268; C21D 8/0436; C21D 4/0468; C21D 4/1233; C21D 8/1266; C21D 8/0278; C21D 8/0478; C21D 8/1277; C21D 9/46; C21D 9/48; C21D 9/52; C21D 2211/001; C21D 2211/0055; C22C 5/06; C22C 5/08; C22C 5/10; C22C 9/00; C22C 19/00; C22C 38/18; B23H 3/00; C25C 7/02; C25C 7/025; C25C 1/12; C25C 1/20; C25C 1/08
See application file for complete search history.

(56) References Cited

U.S. PATENT DOCUMENTS

| | | | |
|---|---|---|---|
| 5,746,081 A | * | 5/1998 | Klamma ................... B21B 1/36 72/229 |
| 7,807,028 B2 | | 10/2010 | Webb |
| 7,807,029 B2 | | 10/2010 | Webb |
| 8,056,228 B2 | * | 11/2011 | Di Franco ............... C25B 11/00 29/592.1 |
| 8,062,498 B2 | | 11/2011 | Palmu |
| 8,133,366 B2 | * | 3/2012 | Webb ........................ C25C 7/02 204/281 |
| 2010/0276281 A1 | * | 11/2010 | Sandoval ................... C25C 7/02 204/288 |
| 2014/0131221 A1 | | 5/2014 | Lindgren et al. |
| 2014/0255244 A1 | | 9/2014 | Tsuge et al. |

FOREIGN PATENT DOCUMENTS

| | | | | |
|---|---|---|---|---|
| CN | 103526130 A | | 1/2014 | |
| EP | 1531014 A2 | * | 5/2005 | ............ B21B 1/227 |
| EP | 2770076 A1 | | 8/2014 | |
| JP | 200443903 A | | 2/2004 | |
| JP | 2009132973 A | | 6/2009 | |
| WO | 2006094355 A1 | | 9/2006 | |
| WO | 2008099057 A1 | | 8/2008 | |
| WO | 2012175803 A2 | | 12/2012 | |
| WO | WO-2013075889 A1 | * | 5/2013 | ............... C25C 1/12 |
| WO | WO-2013159219 A1 | * | 10/2013 | ............. C25B 11/04 |

OTHER PUBLICATIONS

Atlas Steels, Stainless Steel Datasheets, 2011 (Year: 2011).*
JP 2009132973 A, Machine Translation of Patent, 2009 (Year: 2009).*

* cited by examiner

METHOD FOR MANUFACTURING A PLATE MATERIAL FOR ELECTROCHEMICAL PROCESS

CROSS-REFERENCE TO RELATED APPLICATIONS

This application is the United States national phase of International Application No. PCT/FI2016/050039 filed Jan. 26, 2016, and claims priority to Finnish Patent Application No. 20155057 filed Jan. 27, 2015, the disclosures of which are hereby incorporated in their entirety by reference.

The present invention relates to a method for manufacturing a plate material which is used in the electrochemical process of metal, such as electrorefining or electrowinning.

The surface roughness of a cathode plate material is an important parameter for the adhesion of electrochemically plated metals in the hydrometallurgical industry. Experiences from the industry have shown that the surface needs to be rough enough to ensure adhesion and avoid prestripping of the plated metal, but on the other hand not too rough to prevent the adhesion force to be too high making the removal of the plated metal very difficult or damaging the plates in the stripping process. In the copper industry stainless steels have been used as cathode plates both for electrorefining and for electrowinning. The preferred stainless steel grade for a cathode plates has been the grade EN 1.4404 (316L/UNS S31603) with a cold rolled surface 2B. This stainless steel grade contains typically 10-13 weight % nickel, which is an expensive component. Therefore, the copper industry is not only looking for more cost efficient alternatives such as duplex stainless steels as cathode plates, but also more economical processes to manufacture a cathode plate.

An electrochemical process step is one of the final steps in processing of for instance metallic copper. In electrorefining copper anodes and cathodes are positioned in an electrolytic solution that contains copper sulphate and sulphuric acid. An electric current is passed through the solution causing copper from the positively charged anode to be deposited on the negatively charged cathode. Electrowinning of copper is performed by a similar process, but the copper is removed from the solution, instead of the anode, and deposited on the cathode. When an appropriate amount of copper has been deposited on the cathode, the cathode is removed from the solution and stripped in order to remove the copper deposit from the surface of the cathode plate.

The U.S. Pat. No. 7,807,029 relates to a permanent stainless steel cathode plate, the cathode being composed of a low-nickel duplex steel or a lower grade "304" steel, wherein at least one of the cathode surfaces has a surface roughness to produce the adhesion necessary to allow operational adherence. The adhesion is insufficiently strong to prevent the mechanical separation of the copper deposit from the surface. However, the desired adhesion in the U.S. Pat. No. 7,807,029 is only based on the predetermined adhesion characteristics, which determines for the respective surface a surface roughness $R_a$ within the range of 0.6-2.5 micrometer. Any specific determination for adhesion on the surface is not presented as well as the method for manufacturing a cathode plate.

The WO publication 2012/175803 describes a permanent cathode and a method for treating the surface of a permanent cathode. In the method the grain boundaries of the permanent cathode plate surface are treated chemically or electrochemically to achieve the desired surface properties for the adhesion of deposited metal on the surface and the stripping of metal from the surface.

Both the cited U.S. Pat. No. 7,807,029 and the cited WO publication 2012/175803 focus the surface treatment to an individual and separate cathode plate to be used as an electrode in electrowinning of electrorefining. These references do not describe anything how the individual and separate cathode plate has been produced.

The object of the present invention is to prevent some drawbacks of the prior art and to achieve an improved method for manufacturing a plate material to be used in the electrochemical process of metal, such as electrorefining or electrowinning. The essential features of the present invention are enlisted in the appended claims.

According to the present invention a plate material is used as a part of a cathode on which surface a metal is deposited in the electrochemical process of metal, such as electrorefining or electrowinning. The plate material is manufactured in a coil processing line, such as a cold rolling process line, so that the desired surface roughness for adhesion between the metal deposit and the plate material is achieved. The surface roughness of the plate to be used as a part of a cathode is made by at least one mechanical and/or chemical treatment in the coil processing line. The treatments for the desired surface roughness can be for instance one or more of the following treatments pattern rolling, wet-grinding, dry-grinding, shot blasting, pickling, brushing, skin passing or any combination of these treatments.

The plate material to be treated in the coil processing line is advantageously a strip made of stainless steel. After the final treatment in the coil processing line the plate material, a product received from the coil processing line, having the desired surface roughness is kept as a shape of plate, but can be advantageously treated to have a form of a coil. As a shape of a plate the material can be cut into the desired dimensions to be utilized as a part of a cathode on which surface a metal is deposited in an electrochemical process. In the case the plate material is as a form of a coil, the plate material is essentially easy to transfer to a site where the electrochemical process of metal is carried out. The coiled plate material is then cut for a shape advantageous for the operation of the electrochemical process of metal.

The coil processing line in accordance with the invention advantageously contains the process steps such as annealing, chemical surface treatment, mechanical surface treatment, cold rolling. The chemical surface treatment can be for instance pickling. The mechanical treatment can be for instance grinding, wet-grinding or dry-grinding, brushing and shot blasting. The cold rolling can be carried out for instance by pattern rolling. Any combinations of these process steps can be utilized in order to have a plate material with the desired surface roughness. According to one preferred embodiment of the invention the coil processing line for the plate material consists of the treatments pre-annealing and pickling, cold rolling, grinding, final annealing and pickling.

The plate material treated with the invention is utilized as a part of a cathode in an electrochemical process of metal, where the metal to be deposited on the plate material is for instance copper, nickel or silver. The electrochemical process can be for instance electrorefining or electrowinning.

In order to achieve a desired surface roughness for a plate to be used in the electrochemical process of metal, the adhesion in the electrochemical process of metal is determined by measuring a shearing force required to detach the deposited metal between the surface of a plate and metal deposited on the surface of the plate. The shearing force is measured using a tool for use in a tensile testing machine. A specimen made of a plate material such as stainless steel is placed in the tool so that the specimen is movable, but tight enough so that a metal deposit on the surface of the specimen remains on the tool wall where the metal piece is fixed. The tool with the specimen is then placed in a tensile testing machine so that the specimen is pressed down, while the metal deposit is kept at a fixed position. The shearing force required to separate the metal deposit from the specimen is measured when the specimen is lowered.

Figure 2:
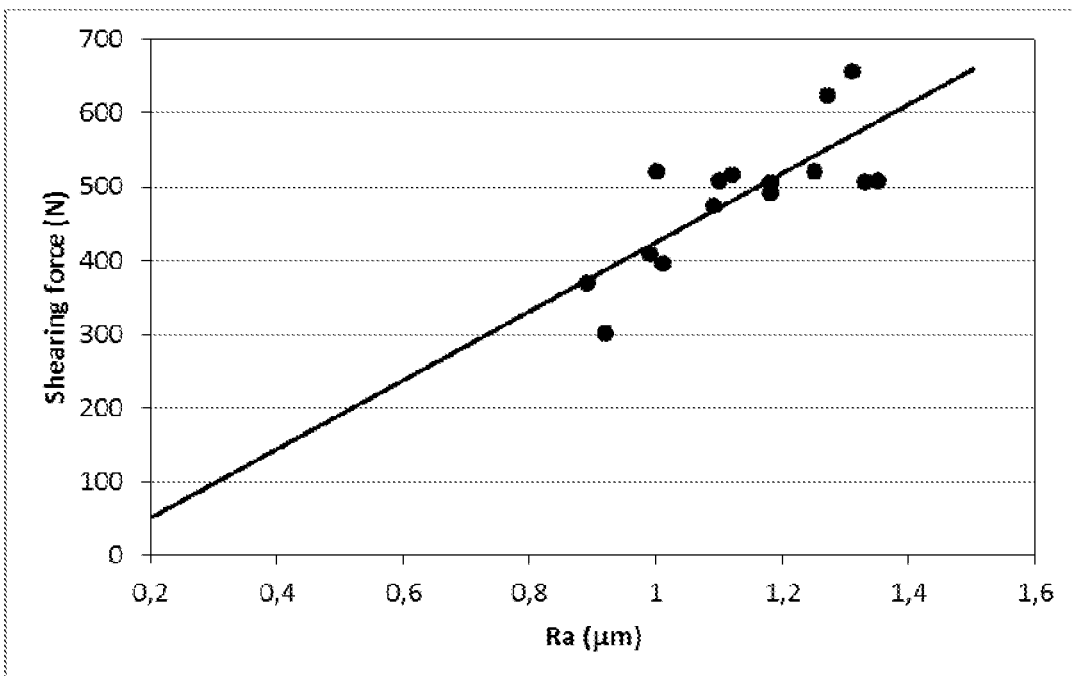

The invention is described in more details referring to the following drawing, where FIG. 1 shows one preferred embodiment of the invention, with copper as the metal to be deposited on the plate material, illustrating the correlation between the shearing force and the surface roughness $R_a$, FIG. 2 shows one preferred embodiment of the invention, with copper as the metal to be deposited on the plate material, illustrating the correlation between the shearing force and the surface roughness $R_a$ in industrial scale.

The effects of a surface roughness and the chemical composition of the plate material to the shearing force between copper to be deposited and the plate to be used in the electrochemical process of copper are determined on one hand using different plate materials and on another hand different surface roughness values on the plate surface. In order to compare whether a plate material itself makes a difference to the shearing force, plate specimens are ground to a similar surface roughness value. For the determination of the effects to shearing force caused by the surface roughness, different surface roughnesses are achieved for the specimens made of the same plate material. Further, the effect of the alignment of grooves achieved advantageously by grinding on the surface of the plate specimen is determined by achieving on the surface both grinding grooves which are parallel to the length of the specimen and grinding grooves which are essentially perpendicular to the length of the specimen.

The copper deposit on the surface of the plate specimen is achieved in an electrochemical cell where an electrolyte consisting of hydrated copper sulphate, sodium chloride, thiourea and sulphur acid is simulating the industrial-scale electrolyte in the copper electrorefining. In the electrochemical cell a saturated calomel reference electrode (SCE) is used to register the potential during the operation, and a platinum mesh is served as a counter electrode. During the electrochemical process air is bubbled into the electrolyte to promote stirring. The electrochemical process will be stopped, when a desired amount of copper is deposited on the surface of the plate specimen.

The main element contents of the chemical compositions for the tested plate materials in weight % are in the following table 1:

TABLE 1

|   | C % | Mn % | Cr % | Ni % | Mo % | N % | Cu % |
|---|---|---|---|---|---|---|---|
| A | 0.020 | — | 17.2 | 10.1 | 2.1 | — | — |
| B | 0.030 | 5.0 | 21.5 | 1.5 | 0.30 | 0.22 | 0.30 |
| C | 0.020 | — | 22.0 | 5.7 | 3.1 | 0.17 | — |

The alloy A represents an austenitic stainless steel of EN 1.4404 (316L/UNS S31603) which typically is used for a cathode plate and which contains in weight % less than 0.03% carbon (C), less than 2% manganese (Mn), 16.5-18.5% chromium (Cr), 10-13% nickel, 2-2.5% molybdenum (Mo) and less than 0.10% nitrogen (N).

The alloy B represents a duplex austenitic ferritic stainless steel of EN 1.4162 (LDX 2101/UNS32101) which typically contains in weight % less than 0.04% carbon (C), 4-6% manganese (Mn), 21-22% chromium (Cr), 1.35-1.70 nickel, 0.1-0.8% molybdenum (Mo), 0.2-0.25% nitrogen (N) and 0.1-0.8 copper (Cu).

The alloy C represents a duplex austenitic ferritic stainless steel of EN 1.4462 (2205/UNS32205) which typically contains in weight % less than 0.03% carbon (C), less than 2% manganese (Mn), 21-23% chromium (Cr), 4.5-6.5 nickel, 2.5-3.5% molybdenum (Mo) and 0.10-0.22% nitrogen (N).

For the determination of the correlation between the surface roughness and the shearing force in the alloys A-C, different surface roughness values are achieved by using different abrasive belts and using abrasive belts that have been more or less worn. Further, different surface roughnesses are achieved by dry grinding or wet grinding of the surface. Also shot blast and pickled surfaces are tested as well as a material which is skin passed in a coil processing line.

In accordance with the invention the surface roughness measurements for the surface roughness values $R_a$ (roughness average) are performed with a surface roughness meter where the cut-off is set to 0.8 mm and the needle traversal speed to 0.5 mm/s for those specimens with the $R_a$ value less than 2.26 micrometer. For the specimens having the $R_a$ value higher than 2.26 micrometer the cut-off is set to 2.5 mm and the needle traversal speed to 1 mm/s.

Each plate specimen was set in the electrochemical cell in order to achieve a copper deposit on the surface of each plate specimen. Before starting the shearing process it was noticed that the interface between the deposited copper and the specimen shows that copper has a very good penetration into very small topographic features of the specimen surface.

For the measurement of the adhesion by shearing force between the deposited copper and the plate surfaces the specimens with the deposited copper are set in a tool so that the specimen can be moved, but the deposited copper remains at the fixed position. The tool is then set in the tensile testing machine, and the cathode plate specimen is moved for the measurement the required force to separate the copper deposit from the plate specimen.

The plate specimens with their surface roughness as well as the measured shearing forces are listed in the following table 2 and in the FIG. 1 for the surface roughness $R_a$. Also the values of the reference material are listed in table 2. In the table 2 the term "worn belt" means an abrasive belt which was utilized for the grinding treatment at least once before the actual treatment, while the term "new belt" means an abrasive belt which was not used for the treatment in accordance with the invention before the actual treatment.

TABLE 2

| Test specimen | Alloy | Surface roughness $R_a$ (μm) | Shearing force (N) |
|---|---|---|---|
| Reference surface (dry-ground) | A | 0.36 | 574.8 |
| Reference surface (dry-ground) | B | 1.87 | 487.5 |
| Reference surface (dry-ground) | B | 1.2 | 480.6 |
| Shot blast and pickled | B | 2.89 | 655.8 |
| Wet ground test 1 worn belt | B | 0.96 | 262.8 |
| Wet ground test 1 new belt | B | 2.24 | 551.5 |
| Wet ground test 2 new belt | B | 1.55 | 407.5 |
| Wet ground test 3 worn belt end | B | 5.15 | 633.3 |
| Wet ground test 3 new belt end | B | 2.26 | 323.9 |

TABLE 2-continued

| Test specimen | Alloy | Surface roughness $R_a$ (μm) | Shearing force (N) |
|---|---|---|---|
| Wet ground test 3 worn belt start | B | 4.56 | 560.0 |
| Wet ground test 3 new belt start | B | 2.18 | 301.0 |

In the table 2 the results are based on three tests where the surface roughness is achieved by wet-grinding and one test where the surface roughness is achieved by the combination of shot-blasting and pickling. It is noticed that the adhesion measured by shearing force increases when the surface roughness values are increasing. An essentially linear trend can be seen for the wet ground surfaces. The shearing force measured between the plate and copper deposited on the surface of the plate is adjusted by the surface roughness of the plate, and as shown in FIG. 1 the shearing force is directly proportional to the surface roughness of the plate when the surface roughness of the plate is achieved by grinding. The highest shearing force value was measured for the specimen, which was treated as a combination of shot-blasting and pickling, first by shot blasting and then by pickling. Further, it was also noticed from the interface between the copper deposit and the stainless steel surface that the copper deposit has good penetration into very small topographic features of the stainless steel surface. Therefore, the surface roughness $R_a$ 0.7-5.5 micrometer, preferably 0.7-2.5 micrometer, is sufficient for the desired adhesion between copper deposit and the stainless steel surface. Thus the shearing force is 250-800 N, preferably 250-650 N.

The connection between the surface roughness and shearing force was also tested in the industrial scale, and the results are given in the table 3 and respectively in the FIG. 2 for the alloy B.

TABLE 3

| Specimen | Surface roughness $R_a$ (μm) | Shearing force (N) |
|---|---|---|
| 1 | 0.92 | 302 |
| 2 | 1.01 | 397 |
| 3 | 1.1 | 509 |
| 4 | 0.99 | 409 |
| 5 | 1.25 | 521 |
| 6 | 1.35 | 509 |
| 7 | 1.31 | 656 |
| 8 | 1.33 | 507 |
| 9 | 1.18 | 505 |
| 10 | 1.18 | 506 |
| 11 | 1.12 | 516 |
| 12 | 1.09 | 474 |
| 13 | 1 | 521 |
| 14 | 1.18 | 492 |
| 15 | 0.89 | 370 |
| 16 | 1.27 | 624 |

The test results in the table 3 and in the FIG. 2 show that the surface roughness and the shearing force have a linear dependency to each other. Further, the results for the adhesion measured by shearing forces are essentially at the same ranges as the values for the shearing forces in the laboratory scale.

The invention claimed is:

1. A method for manufacturing a plate material adapted to be a cathode for electrochemical processing of a metal, wherein the metal is deposited on a surface of the cathode during the electrochemical processing, the method comprising:

providing a processing line comprising a cold rolling unit and at least one surface treatment unit that is separate from the cold rolling unit; and using the processing line to cold roll the plate material and modify a surface roughness of the surface of the plate material, wherein the surface of the plate material that has been modified is the surface of the cathode on which the metal is deposited during the electrochemical processing, the surface of the plate material that has been modified has a roughness average $R_a$ of 0.7-5.5 micrometers, and the surface of the plate material that has been modified provides a shearing force required to detach the deposited metal from the surface of the plate material that has been modified of 250-800 N, and wherein the plate material, after modification, is provided in the form of a coil.

2. The method according to claim 1, wherein the modification of the surface roughness of the surface of the plate material is achieved mechanically.

3. The method according to claim 1, wherein the modification of the surface roughness of the surface of the plate material is achieved by wet-grinding.

4. The method according to claim 1, wherein the modification of the surface roughness of the surface of the plate material is achieved by dry-grinding.

5. The method according to claim 1, wherein the modification of the surface roughness of the surface of the plate material is achieved by shot blasting.

6. The method according to claim 1, wherein the modification of the surface roughness of the surface of the plate material is achieved by brushing.

7. The method according to claim 1, wherein the modification of the surface roughness of the surface of the plate material is achieved by pattern rolling.

8. The method according to claim 1, wherein the modification of the surface roughness of the surface of the plate material is achieved chemically.

9. The method according to claim 1, wherein the modification of the surface roughness of the surface of the plate material is achieved mechanically and chemically.

10. The method according to claim 9, wherein the modification of the surface roughness of the surface of the plate material is achieved by shot blasting and pickling.

11. The method according to claim 1, wherein the modification of the surface roughness of the surface of the plate material is achieved by a combination of processes.

12. The method according to claim 1, wherein the roughness average $R_a$ is 0.7-2.5 micrometers.

13. The method according to claim 1, wherein the shearing force is 250-650 N.

14. The method according to claim 1, wherein the metal is copper.

15. The method according to claim 14, wherein the electrochemical process is electrorefining and the metal is copper.

16. The method according to claim 14, wherein the electrochemical process is electrowinning and the metal is copper.

17. The method according to claim 1, wherein the metal is silver.

18. The method according to claim 17, wherein the electrochemical process is electrorefining and the metal is silver.

19. The method according to claim 17, wherein the electrochemical process is electrowinning and the metal is silver.

20. The method according to claim 1, wherein the metal is nickel.

21. The method according to claim 20, wherein the electrochemical process is electrorefining and the metal is nickel.

22. The method according to claim 20, wherein the electrochemical process is electrowinning and the metal is nickel.

23. The method according to claim 1, wherein the plate material is an austenitic stainless steel which contains in weight % less than 0.03% carbon (C), less than 2% manganese (Mn), 16.5-18.5% chromium (Cr), 10-13% nickel (Ni), 2-2.5% molybdenum (Mo) and less than 0.10% nitrogen (N).

24. The method according to claim 1, wherein the plate material is a duplex austenitic ferritic stainless steel which contains in weight % less than 0.04% carbon (C), 4-6% manganese (Mn), 21-22% chromium (Cr), 1.35-1.70% nickel (Ni), 0.1-0.8% molybdenum (Mo), 0.2-0.25% nitrogen (N) and 0.1-0.8 copper (Cu).

25. The method according to claim 1, wherein the plate material is a duplex austenitic ferritic stainless steel which contains in weight % less than 0.03% carbon (C), less than 2% manganese (Mn), 21-23% chromium (Cr), 4.5-6.5% nickel (Ni), 2.5-3.5% molybdenum (Mo) and 0.10-0.22% nitrogen (N).

* * * * *